United States Patent [19]
Ando

[11] 3,997,676
[45] Dec. 14, 1976

[54] INSTANT-COOKING CUPPED NOODLES AND A METHOD OF PRODUCING THE SAME

[75] Inventor: Momofuku Ando, Osaka, Japan

[73] Assignee: Nissin Shokuhin Kaisha, Ltd., Osaka, Japan

[22] Filed: Mar. 19, 1976

[21] Appl. No.: 668,494

Related U.S. Application Data

[63] Continuation-in-part of Ser. No. 291,601, Sept. 25, 1972, abandoned.

[52] U.S. Cl. ............................. 426/113; 426/451; 426/439; 426/458; 426/557
[51] Int. Cl.² ........................................ A23L 1/16
[58] Field of Search .......... 426/113, 438, 439, 451, 426/458, 459, 512

[56] References Cited

UNITED STATES PATENTS

| | | | |
|---|---|---|---|
| 2,615,809 | 10/1952 | Jean | 426/440 |
| 2,768,086 | 10/1956 | Bliley | 426/557 |
| 3,061,440 | 10/1962 | Johannes | 426/517 |
| 3,318,707 | 5/1967 | Ernst | 426/451 |

OTHER PUBLICATIONS

Sing An "The Chinese Cook Book" Culinary Arts Press, Reading, Pa. pp. 17, 18, 1950.
Yang Chao, "How to Cook in Chinese" The John Day Co., New York, 1949, pp. 199–200.
Ziemba, "Food Engineering" June 1952, pp. 131, 133.

*Primary Examiner*—Raymond N. Jones
*Attorney, Agent, or Firm*—Armstrong, Nikaido & Wegner

[57] ABSTRACT

A noodle cup is disclosed containing a lump of instantly cookable noodles having an evenly distributed, reduced moisture content in which the noodle lump has a less dense lower portion as compared with the upper portion and a shape corresponding to the inside of the hermetically sealed cup, which tapers to a base of smaller diameter than the top. The noodle lump is disposed in the cup in frictional engagement with the sides of the cup and at a spaced distance from the top and bottom of the cup. The noodle lump is formed by filling the cup shaped mold with 50–80% by volume of gelatinized noodles and then dehydrating the noodles by dipping the mold into heated frying oil so that the noodles rise to the top of the mold.

8 Claims, 3 Drawing Figures

INSTANT-COOKING CUPPED NOODLES AND A METHOD OF PRODUCING THE SAME

BACKGROUND OF THE INVENTION

This application is a continuation-in-part application of Ser. No. 291,601 filed Sept. 25, 1972, now abandoned.

The present invention relates to instant-cooking noodles and a process for producing them and more particularly, to novel containerized instant-cooking noodles reconstitutable into a food preparation a few minutes after being mixed with hot water.

Conventional processes for producing instant-cooking noodles, are characterized by frying moist noodles which have been preformed into strips such as described in "Food Engineering, June, 1952," by John V. Ziemba, who discloses hand-forming moist noodles to the desired shape and frying the noodles in a wire-mesh mold to form a noodle nest which is packaged in a carton. The resultant food is boiled for a few minutes and served in a dish or cup for consumption. If such noodles are mixed with hot water instead of being boiled, however, they require a much longer time to be ready for consumption and the tissue of the reconstituted food preparation does not have the elastic quality of glossy appearance which is desirable.

Further, the described procedure contains no recognition of a method preparing the noodle nest to have a relatively denser upper portion to facilitate cooking or of shaping the noodles so that they fit in their container with a spaced distance above and below to permit the addition of hot water.

Conventional noodles such as those described above also frequently have been fried in the form of thin lumps such as nests and discs, which are quickly permeated by hot oil. When the noodle lump, however, is of a cup-like shape or is rather thick, the oil does not penetrate well into the inside of the lump so that the inner portion is not fried completely while the outer portion may be overcooked and dried out. This prevents even or equal frying all through the lump. Noodles fried in this manner are also difficult for water to permeate and therefore difficult to be reconstituted into a food preparation.

If conventional noodle products are packed directly into a carton, spaces exist between the noodles and carton walls so that the noodles are easily damaged as the packages are moved for transportation or conveying.

Furthermore, such conventional products require boiling for prolonged periods thereby necessitating heaters, pans and dishes or cups, so that cooking and eating places are considerably limited.

SUMMARY OF THE INVENTION

It is, therefore, an object of this invention to overcome the various disadvantages described above.

It is a further object of the present invention to provide a multiple-function container which can serve for storage, packaging, cooking and eating, so that pans and dishes or cups are not necessary for consumption.

It is another object thereof to provide a noodle product which can be reconstituted into a palatable food preparation only by being mixed with hot water without being boiled.

It is a further object of this invention to provide a uniform, evenly cooked noodle lump which does not have uncooked portions and is not either overcooked or brittle.

It is also an object of the present invention to provide a noodle lump having a tapered, conical shape to fit snugly into a cup of similar shape with the sides of the cup and noodle lump in engagement and a space provided in the cup above and below the noodle lump.

It is a further object to provide a noodle lump which is more dense in the upper portion and less dense in the lower portion so that the lump is quickly readied for consumption by simply adding hot water.

It is a further object of the present invention to form a cup-shaped noodle lump simultaneously with frying the noodles so that they can easily be packed in cup-shaped containers, thus enabling continuous packaging.

It is a further object of this invention to provide a noodle lump which is packed into the container so that space is retained over the lump so that desicated meats, vegetables, etc. can be placed thereon, thus increasing the commercial desirability and value of the noodle product.

BRIEF EXPLANATION OF THE DRAWINGS

These and other objects, features and advantages of the present invention will be apparent from the following detailed description taken in conjunction with the accompanied drawings, in which.

DETAILED DESCRIPTION OF THE INVENTION

Figure 1:
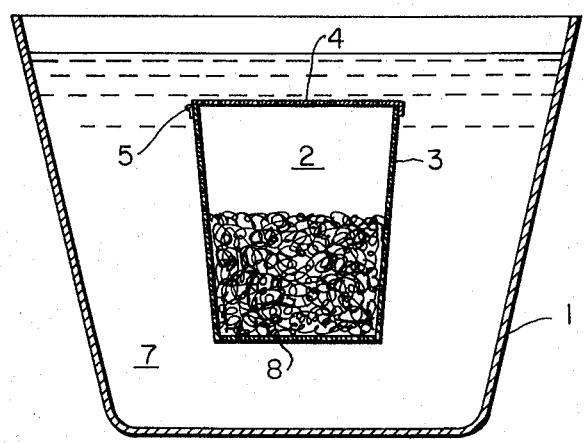
FIG. 1 is a cross-sectional side view of a dehydrating means according to one embodiment of the invention at the beginning of frying.

According to the present invention, wheat flour is mixed with water containing dissolved sodium chloride and potassium carbonate and then formed into strips, strings or ribbons, which are boiled or steamed at a temperature of 90°–100° C for 30–180 seconds to contain 25–40% moisture. It is essential that such paste strips be steamed or boiled before a subsequent frying so that the tissue of the fried pastes will be sufficiently elastic and glassy on the surface when reconstituted into food preparations with hot water.

Referring to the drawings, the strips are put into a stainless steel mold 2 which is either porous or with small openings 3 or of wire mesh to permit the easy passage of oil therethrough upon frying. Mold 2 has a top cover 4 of the same material with a hinge 5 for easy opening and closing. Mold 2 is of inverted frusto-conical shape and has a circular or polygonal cross section.

The percent by volume of the mold which is occupied by the paste strips is critical since, if it is 100% as in conventional processes, there will be close contact between the strips during the subsequent frying procedure. This prevents the easy passage of oil between the strips and thus prevents even or equal frying of the strips. More precisely, the oil heat cannot be conducted well into the interior of the mass of strips so that the interior is not well fried and the outer portion is overfried. Moreover, the period of time required for frying is increased. Since this tendency increases with the height of the mold, it is important that the amount of the strips be less by volume than the volume of the cup-like mold in which the strips are placed in accordance with the present invention. More specifically, it is critical that the strips occupy 50–80%, preferably 70–80%, of the mold as shown by the following table of experimental results:

| Occupancy of Mold by Noodles (% by volume) | Moisture Content of Fried Noodles (% by weight) | | | Period for Preparation with Hot Water (minutes) | Status of Fried Noodles |
|---|---|---|---|---|---|
| | Surface | Interior | Average | | |
| 100 | 4.5 | 15.0 | 7.0 | 5–6 | tough |
| 90 | 4.2 | 11.0 | 5.6 | 4–5 | tough |
| 80 | 3.5 | 4.5 | 3.7 | 3–4 | tough |
| 70 | 3.3 | 4.3 | 3.5 | 3–4 | tough |
| 60 | 3.2 | 4.2 | 3.4 | 3–4 | tough |
| 50 | 3.1 | 4.0 | 3.3 | 3–4 | slightly fragile |
| 40 | 3.0 | 3.5 | 3.2 | 3–4 | fragile |
| 30 | 2.8 | 2.9 | 2.8 | 3–4 | fragile |

These strips were prepared by placing steamed paste strips containing 40% moisture into inversed frusto-conical molds 6 centimeters tall, 7 centimeters in bottom diameter and 9 centimeters in top diameter to occupy 100, 80 and 40% of the respective molds. The strips in the molds were then fried at a temperature of 140° C for 150 seconds.

The respective indicated amounts of strips were placed in mold 2 with top 4 closed and dipped into hot oil 7 in a pot 1 where it was allowed to shift around for 1–3 minutes to facilitate frying. Early in the frying process the strips spread or diffuse within the mold due to the rapid dehydration so that they are equally and uniformly fried.

Figure 2:
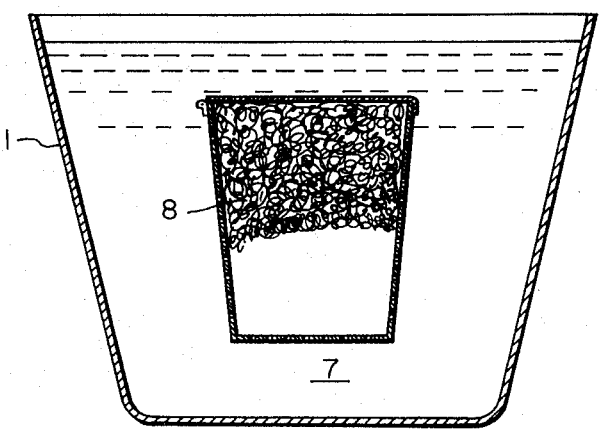
FIG. 2 is a cross-sectional side view of the dehydrating means of FIG. 1 after frying is completed.

As the frying progresses, a paste strips lump 8 containing about 40% moisture in each noodle becomes impervious to the heated oil and during evaporation and dissemination of the moisture, strips 8 float upward one by one. As shown in FIG. 2, the noodles thus come into contact with top cover 4 of mold 2. As the lump is pressed upward against top 4 by its buoyancy and expansion, the top of lump 8 is automatically flattened to give lump 8 a cup-like form having the same shape as the container in which it will be placed and the upper portion if made more dense. Since the bottom part of lump 8 has not received any pressure, it becomes solid in a comparatively coarse or loose state.

When the heat treatment for dehydrating noodle lump 8 is completed, mold 2 is taken out and heat-treated noodles 8 containing a reduced amount of uniformly distributed moisture in each noodle, typically about 5% or less, are removed. The hot lump 8 which is at a temperature of about 120° C is cooled to about 30° C in an air jet and put into a cup-like container 9 of the same shape as mold 2 but having a somewhat greater diameter. The noodle lump is disposed close to the inside of the wall of the container because of its weight with spaces remaining at the top and bottom of the container. Cup 9, which is advantageously made of heat insulating material such as foam-type synthetic plastic or double walled paper or double walled plastics, preferably also contains powdered soup, appropriate vegetables, meat, egg and other ingredients 10 in the space above the processed noodle lump 8. The top of cup 9 is hermetically sealed by air-tight and moisture-proof film 11, for example, of paper lined with aluminum foil, polyethylene, etc. The containerized food is wrapped up with a heat contractible film for moisture-proof storage.

Figure 3:
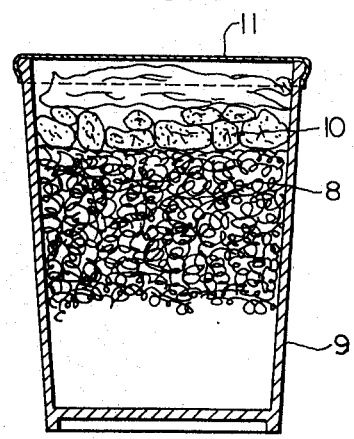
FIG. 3 is a cross-sectional side view of a noodle lump hermetically sealed in its container.

The packaged noodle lump is flat at the top and more dense at the upper portion and closely contacts the inner side wall of the container as shown in FIG. 3. It is essential that the container have larger dimensions than the lump since the lump will expand when hot water is added. Although the packaged ingredients tend to be loose within larger containers, the noodle lump of the present invention is disposed at the lower or middle portion of the inversed frusto-conical container which is larger than the lump so that the sides of the noodle lump and the container are in frictional engagement and a space is provided above and below the lump in the cup. This prevents the lump from moving about or vibrating in the container so that the lump is not broken or otherwise distorted out of shape and the container is not as likely to be broken. Furthermore, the noodle lump which is placed in this manner reduces heat loss from the hot water at the bottom space of the container. In this manner, the lower portion of the lump receives more heat and swells.

The denser top portion of the lump prevents the lower portion from loosing heat and remaining unswelled. Thus, uniformly heated and swelled noodles are achieved.

The flat and dense top of the lump can advantageously have placed thereon dried meats, vegetables, etc., which will not fall into the lump and will therefore present colorful and tasty appearance.

When the noodles are to be served, boiling water can be easily poured over the top of noodle lump to permeate the lump thereby yielding a quick and effective restoration of the noodles. Subsequently, the powdered soup is dissolved by the water and the noodles with soup served, with or without other appropriate ingredients. Thus, cup-like container 9 functions especially when used for outdoor consumption, as a storage container, cooking pot and serving bowl which can be kept in one hand even hot water is poured into it, because of being heat-insulated material.

In accordance with the present invention, the noodle lump is molded to a shape corresponding to the cup and then is placed therein, being free from disfigurement while being handled and also in transit, to maintain its commercial value without damage. It also is easy to fill the cups with the processed noodles to improve the productivity thereof.

Further, the commercial value of the noodles according to the present invention is high because of the flat-pressed top of the noodle lump formed by the buoyancy and expansion forces thereof during the frying process. The low density of the major lower portion of the lump makes it possible to evenly dehydrate the lump to its core with an accompanying superior exterior appearance, and additionally permits boiling water at the time of serving to permeate evenly and sufficiently through the lump's core in an extremely short time to restore the noodles.

Noodle lumps of the present invention, because of their quick restoration properties when subjected to boiling water, can conveniently be served to the general public as a very convenient ration-type lumch, holiday snack for outings and/or emergency food, thereby contributing greatly to an improvement in dietary life of the general public.

EXAMPLE

Wheat flour was mixed with 30% by weight based on the flour of a solution containing 5% sodium chloride, 0.7% potassium carbonate and 0.4% sodium carbonate, all by weight based on the water. The mixture thereby prepared was formed into 0.8 millimeter thick and 1.2 millimeter wide ribbon strips through rollers. The ribbon strips were steamed at 95°–100° C for 90 seconds, to a moisture content of 32% by weight. A 7 Centimeter tall porous stainless steel mold was loaded with the steamed ribbon strips by 80% by volume and was closed with its top before fried at 140° C for 150 seconds to obtain an evenly and uniformly fried cup-shaped ribbons lump with about 5% by weight moisture and denser in the upper portion and less dense in the lower portion and flat at the top. The lump was put into a foamed styrene container corresponding to the shape of an smaller than the dimensions of the mold. Dehydrated meats, vegetables, etc. were placed on the lump before the container was hermetically sealed with a film lined with aluminum foil.

While the best form and embodiment of the invention has been described, it will be readily apparent to those skilled in the art that modifications and changes may be made without deviating from the invention set forth hereinafter in the claims.

What is claimed is:

1. A noodle cup comprising:
   a. a hermetically-sealed, heat-insulating cup having sides which taper to a base of a diameter smaller than the top portion of the cup; and
   b. contents comprising a preformed, dehydrated noodle lump of instant-cookable noodles disposed in the cup, the individual noodles being substantially evenly dehydrated to the core thereof, said noodle lump having been preformed and disposed by the process comprising:
      1. forming noodles from a noodle dough;
      2. gelatinizing said noodles by steaming or boiling at a temperature and for a period of time such that the noodles contain 25–40% moisture;
      3. providing a cup-shaped mold corresponding substantially in size and shape to the inner shape of a cup into which said noodles are to be disposed and having a top and bottom and permeable upper and lower portions for permitting frying oil to pass therethrough;
      4. placing a sufficient quantity of said gelatinized noodles into said mold to occupy 50–80% thereof by volume;
      5. dehydrating said noodles by dipping said mold containing said noodles into heated frying oil for a period of time sufficient to cause the noodles to move upward into contact with said permeable upper portion during evaporation and dissemination of moisture therefrom, thereby producing a lump having a dense upper portion, a dense lower portion and a shape corresponding to the inner shape of said mold;
      6. removing said mold from said oil;
      7. removing said noodle lump from said mold;
      8. drying said noodle lump before placement of the noodle lump into said cup;
      9. placing the dried noodle lump into said heat-insulating cup with the denser portion of the lump being upwardly disposed, the sides of the lump being in frictional engagement with the sides of the cup and the lump being seated at spaced distances from the top and bottom of the cup, and;
      10. hermetically sealing said cup whereby the contents of the cup are capable of being stored and subsequently cooked and restored in an extremely short period of time by the addition of hot water to the cup, the hot water being first received in the spaced distance in the bottom of the cup to heat the contents during which time, the denser portion of the noodle lump tends to retard heat loss during cooking.

2. A noodle cup according to claim 1 wherein said heat insulating material is selected from the group consisting of foamed plastic, double walled paper and double walled plastic.

3. A noodle cup according to claim 1 wherein said noodles are gelatinized at a temperature of 90°–100° C for 30–180 seconds.

4. A noodle cup according to claim 1 further comprising other edible ingredients disposed within said hermetically-sealed cup above said noodle lump.

5. A method for producing instant-cooking cupped noodles comprising:
   1. forming strips from a dough made substantially of wheat flour;
   2. gelatinizing said noodles by steaming or boiling at a temperature and for a period of time such that the noodles contain 25–40% moisture;
   3. providing a cup-shaped mold having a top and bottom and permeable upper and lower portions for permitting frying oil to pass therethrough and sides which taper to a base of a diameter smaller than the top portion of the mold;
   4. placing sufficient said gelatinized noodles into said mold to occupy 50–80% thereof by volume;
   5. dehydrating said noodles by dipping said mold containing said noodles into heated frying oil for a period of time sufficient to cause the noodles to move upward into contact with said permeable upper portion during evaporation and dissemination of moisture therefrom, thereby producing a noodle lump having a dense upper portion and a less dense lower portion and a shape corresponding to the inner shape of said mold;
   6. removing said mold from said oil;
   7. removing said noodle lump from said mold;
   8. drying said noodle lump before placement of the noodle lump into a cup into which said noodles are to be disposed:
   9. placing the dried noodle lump into said heat-insulating cup with the denser portion of the lump being upwardly disposed, the sides of the lump being in frictional engagement with the sides of the cup and the lump being seated at spaced distances from the top and bottom of the cup;
   10. hermetically sealing said cup whereby the contents of the cup are capable of being stored and subsequently cooked and restored in an extremely short period of time by the addition of hot water to the cup, the hot water being first received in the spaced distance in the bottom of the cup to heat the contents during which time, the denser portion of the noodle lump tends to retard heat loss during cooking.

6. A method according to claim 5 wherein said noodles are gelatinized at 90°–100° C for 30–180 seconds.

7. A method according to claim 5 wherein said gelatinized noodles are added in an amount occupying about 70–80% of the interior of said mold.

8. A method according to claim 7 wherein prior to hermetic sealing, the upper portion of said cup is stuffed with other edible ingredients.

* * * * *

UNITED STATES PATENT AND TRADEMARK OFFICE
CERTIFICATE OF CORRECTION

PATENT NO. : 3,997,676
DATED : December 14, 1976
INVENTOR(S) : MOMOFUKU ANDO

It is certified that error appears in the above-identified patent and that said Letters Patent are hereby corrected as shown below:

Claim 1, subparagraph b5, line 7, insert --less-- before "dense" (second occurrence), so that the line reads in totality: "lump having a dense upper portion, a less dense"

Signed and Sealed this

Twenty-ninth Day of July 1980

[SEAL]

Attest:

SIDNEY A. DIAMOND

Attesting Officer    Commissioner of Patents and Trademarks

Disclaimer 3,997,676.—*Momofuku Ando*, Osaka, Japan. INSTANT-COOKING CUPPED NOODLES AND A METHOD OF PRODUCING THE SAME. Patent dated Dec. 14, 1976. Disclaimer filed July 19, 1978, by the assignee, *Nissin Shokuhin Kaisha, Ltd.*

Hereby enters this disclaimer to claims 3 and 6 of said patent.

[*Official Gazette November 17, 1981.*]